US012620751B2

(12) United States Patent
Noguchi et al.

(10) Patent No.: US 12,620,751 B2
(45) Date of Patent: May 5, 2026

(54) CONNECTOR WITH PAIR OF TERMINALS AND COUPLING PORTION

(71) Applicant: IRISO ELECTRONICS CO., LTD., Yokohama (JP)

(72) Inventors: Daisuke Noguchi, Yokohama (JP); Hiroaki Yukutake, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 316 days.

(21) Appl. No.: 18/470,666

(22) Filed: Sep. 20, 2023

(65) Prior Publication Data

US 2024/0113469 A1 Apr. 4, 2024

(30) Foreign Application Priority Data

Sep. 29, 2022 (JP) ................................ 2022-156399

(51) Int. Cl.

*H01R 13/518* (2006.01)
*H01R 12/71* (2011.01)
*H01R 13/405* (2006.01)
*H01R 13/6473* (2011.01)

(52) U.S. Cl.

CPC ......... *H01R 13/518* (2013.01); *H01R 12/716* (2013.01); *H01R 13/405* (2013.01); *H01R 13/6473* (2013.01)

(58) Field of Classification Search

CPC ................................................ H01R 13/6474
See application file for complete search history.

(56) References Cited

U.S. PATENT DOCUMENTS 6,183,302 B1 2/2001 Daikuhara et al.
6,293,827 B1 9/2001 Stokoe
6,361,367 B1 3/2002 Daikuhara et al.
(Continued)

FOREIGN PATENT DOCUMENTS

EP 1531653 A1 5/2005
JP H11329635 A 11/1999
(Continued)

OTHER PUBLICATIONS

Extended European Search Report, for European Patent Application No. 23199097.9, dated Mar. 4, 2024, 9 pages.

*Primary Examiner* — Oscar C Jimenez
(74) *Attorney, Agent, or Firm* — Westman, Champlin & Koehler, P.A.

(57) ABSTRACT

A board connector includes a pair of inner terminals. The board connector includes a terminal body. Further, the board connector includes a low-dielectric constant portion having a relative dielectric constant set to be lower than that of the terminal body and interposed between the intermediate extending portion of one of the inner terminals and the intermediate extending portion of the other one of the inner terminals. An spacing between the intermediate extending portion of the one inner terminal and the intermediate extending portion of the other inner terminal is set to be smaller than at least one of an spacing between the fitting-side extending portion of the one inner terminal and the fitting-side extending portion of the other inner terminal or an spacing between the board-side extending portion of the one inner terminal and the board-side extending portion of the other inner terminal.

4 Claims, 16 Drawing Sheets

(56) References Cited

U.S. PATENT DOCUMENTS

| | | | | |
|---|---|---|---|---|
| 6,371,812 | B1 | 4/2002 | Daikuhara et al. | |
| 7,131,870 | B2 * | 11/2006 | Whiteman, Jr. | H01R 13/514 439/607.06 |
| 8,172,614 | B2 * | 5/2012 | Kirk | H01R 13/6585 439/108 |
| 8,540,525 | B2 * | 9/2013 | Regnier | H01R 13/646 439/79 |
| 10,581,203 | B2 * | 3/2020 | Cartier, Jr. | H01R 12/722 |
| 11,563,291 | B2 | 1/2023 | Gilkey et al. | |
| 2002/0168898 | A1 * | 11/2002 | Billman | H01R 13/6471 439/607.07 |
| 2014/0248796 | A1 | 9/2014 | Pan | |
| 2014/0273651 | A1 * | 9/2014 | Pao | H01R 12/724 439/660 |
| 2021/0066857 | A1 | 3/2021 | Gilkey et al. | |
| 2023/0144535 | A1 | 5/2023 | Stamm et al. | |

FOREIGN PATENT DOCUMENTS

| | | | |
|---|---|---|---|
| JP | 2000068006 | A | 3/2000 |
| JP | 2000260529 | A | 9/2000 |
| JP | 2003522387 | A | 7/2003 |
| JP | 2004014800 | A | 1/2004 |
| JP | 2004274047 | A | 9/2004 |
| JP | 2011018655 | A | 1/2011 |
| JP | 2012252904 | A | 12/2012 |
| WO | 2019136199 | A2 | 7/2019 |
| WO | 2021228655 | A1 | 11/2021 |

* cited by examiner

CONNECTOR WITH PAIR OF TERMINALS AND COUPLING PORTION

CROSS-REFERENCE TO RELATED APPLICATION

This application is based on and claims priority under 35 USC 119 from Japanese Patent Application No. 2022-156399, filed on Sep. 29, 2022, the disclosure of which is incorporated by reference herein.

BACKGROUND

Technical Field

The present disclosure relates to a connector.

Related Art

Japanese Patent Application Laid-Open (JP-A) No. 2011-18655 discloses a connector for transmitting a differential signal. In the connector described in this literature, a middle portion of an inner terminal of a pair of terminals is configured to approach an outer terminal in the middle of its length. That is, the lengths of transmission paths of the inner terminal and the outer terminal are made as equal as possible by adjusting the length of the inner terminal. In this way, signal skew is reduced, and occurrence of transmission errors can be suppressed.

In the connector described in JP-A No. 2011-18655, a common mode impedance increases in a close arrangement portion where the outer terminal and the inner terminal are close to each other. As a result, common mode noise that has occurred is less likely to propagate beyond the close arrangement portion, and occurrence of transmission errors caused by the common mode noise can be suppressed.

SUMMARY

As described above, the common mode impedance increases as the outer terminal and the inner terminal approach each other, and propagation of the common mode noise is suppressed. On the other hand, in a case where the outer terminal and the inner terminal are brought close to each other, a differential impedance (characteristic impedance) decreases. That is, the connector described in JP-A No. 2011-18655 has room for improvement from the viewpoint of achieving both a countermeasure against the common mode noise and impedance matching.

In consideration of the above fact, an object of the present disclosure is to obtain a connector capable of achieving both a countermeasure against common mode noise and impedance matching.

According to a first aspect, a connector includes: a pair of terminals, each of which includes a first connecting portion to which a first connection target object is connected, a second connecting portion to which a second connection target object is connected, and a coupling portion that couples the first connecting portion and the second connecting portion to each other, the pair of terminals being arranged with a spacing therebetween and a differential signal being transmitted via the pair of terminals; a dielectric portion that holds the pair of terminals; and a low-dielectric constant portion that has a lower relative dielectric constant than a relative dielectric constant of the dielectric portion and that is interposed between the coupling portion of one of the terminals and the coupling portion of another of the terminals, wherein a spacing between the coupling portion of the one of the terminals and the coupling portion of the other of the terminals is smaller than at least one of a spacing between the first connecting portion of the one of the terminals and the first connecting portion of the other of the terminals or a spacing between the second connecting portion of the one of the terminals and the second connecting portion of the other of the terminals.

In the connector of the first aspect, the differential signal is transmitted between the first connection target object and the second connection target object through the pair of terminals. Here, the pair of terminals is held by the dielectric portion. In addition, the low-dielectric constant portion having a relative dielectric constant set to be lower than that of the dielectric portion is interposed between the coupling portion of the one of the terminals and the coupling portion of the other of the terminals. As a result, a decrease in impedance can be suppressed as compared with a configuration in which a part of the dielectric portion is interposed between the coupling portion of the one of the terminals and the coupling portion of the other of the terminals. An spacing between the coupling portion of the one of the terminals and the coupling portion of the other of the terminals is set to be smaller than at least one of the interval between the first connecting portion of the one of the terminals and the first connecting portion of the other of the terminals or the interval between the second connecting portion of the one of the terminals and the second connecting portion of the other of the terminals. As a result, it is possible to reduce skew of a differential signal as compared with a configuration in which the interval between the coupling portion of the one of the terminals and the coupling portion of the other of the terminals is set outside the above range. In addition, it is possible to increase a common mode impedance at the coupling portions of the pair of terminals as compared with a configuration in which the interval between the coupling portion of the one of the terminals and the coupling portion of the other of the terminals is set outside the above range. As a result, common mode noise that has occurred is less likely to propagate beyond between the coupling portions of the pair of terminals, and as a result, propagation of the common mode noise can be suppressed. As described above, in the connector of the first aspect, it is possible to achieve both a countermeasure against the common mode noise and impedance matching.

According to a second aspect, in the connector of the first aspect, the pair of terminals is held in a state of being embedded in the dielectric portion, and the low-dielectric constant portion is a gap formed between the coupling portion of the one of the terminals and the coupling portion of the other of the terminals.

In the connector of the second aspect, the pair of terminals is held in a state of being embedded in the dielectric portion. The low-dielectric constant portion is a gap formed between the coupling portion of the one of the terminals and the coupling portion of the other of the terminals. In this configuration, for example, the pair of terminals can be held by the dielectric portion by insert molding. In addition, a portion where a part of a metal mold is positioned can be the gap by opening the metal mold for insert molding. Thus, the productivity of the connector can be improved.

According to a third aspect, in the connector of the first aspect. The connector according to claim 1, wherein the dielectric portion includes a cover portion which covers part of the coupling portion of the one of the terminals at a side opposite from the low-dielectric constant portion.

In the connector of the third aspect, the dielectric portion includes the cover portion, and the cover portion covers the part of the coupling portion of the one of the terminals on the side opposite to the low-dielectric constant portion. In this configuration, it is possible to suppress an increase in skew of a differential signal due to a decrease in electrical length of the one terminal as compared with a configuration in which the entire coupling portion of the one of the terminals is covered with a part of the dielectric portion.

The connector according to the present disclosure has an excellent effect of achieving both a countermeasure against common mode noise and impedance matching.

BRIEF DESCRIPTION OF THE DRAWINGS

Exemplary embodiments of the present disclosure will be described in detail based on the following figures, wherein.

DETAILED DESCRIPTION

A board connector 12 as a connector according to an embodiment of the present disclosure will be described with reference to FIGS. 1 to 16.

Figure 1:
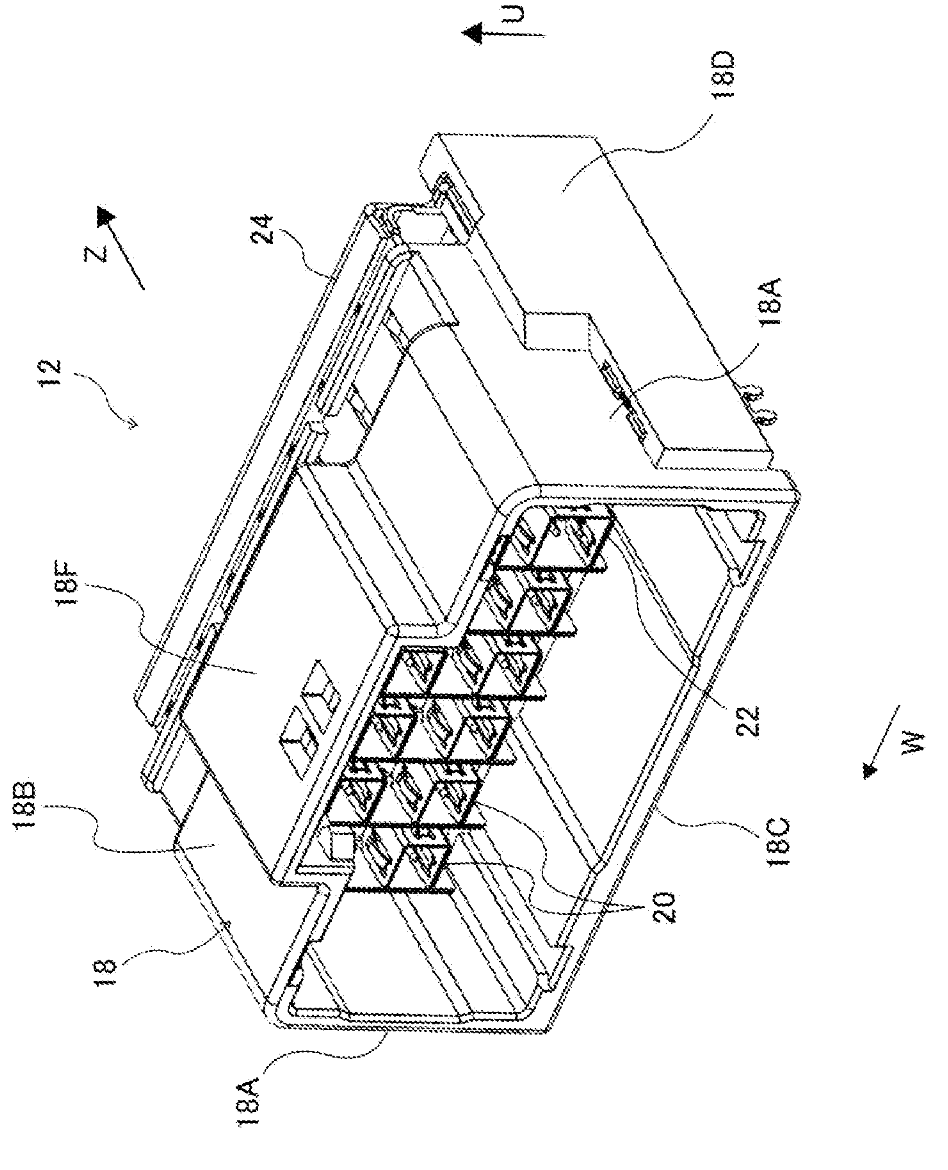
FIG. 1 is a perspective view of a board connector.
Figure 2:
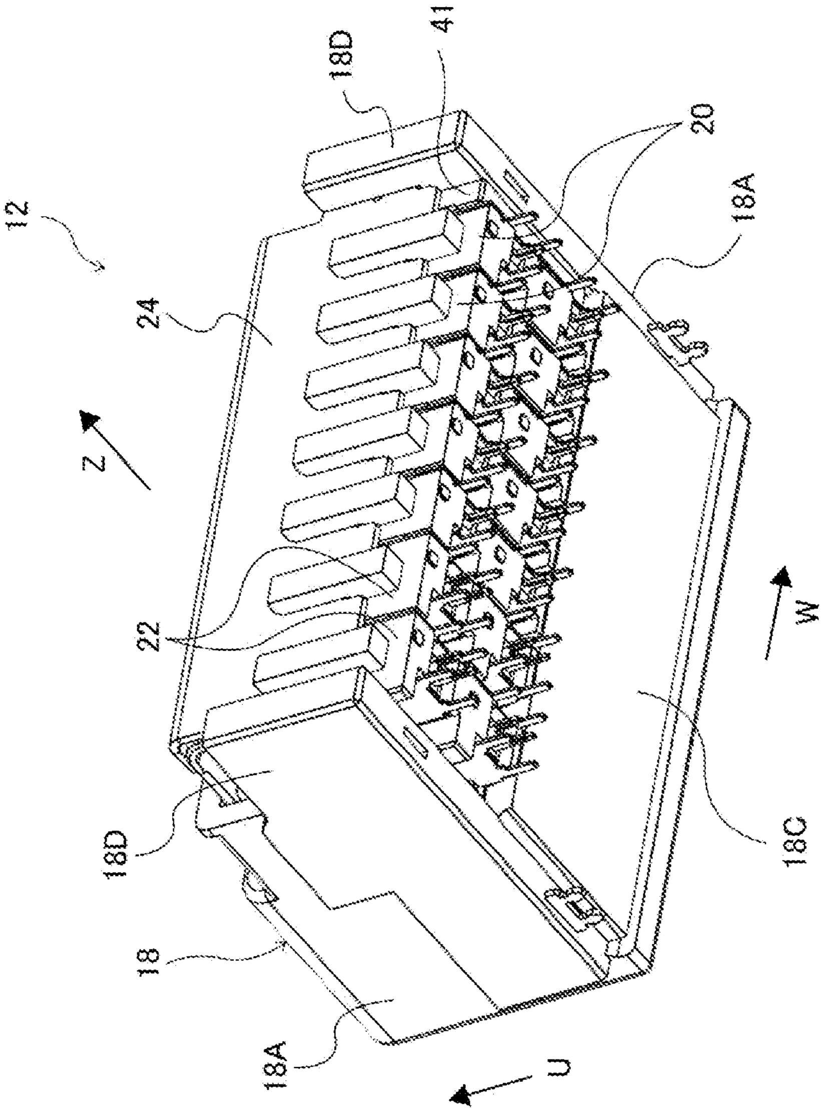
FIG. 2 is a perspective view of the board connector as viewed from a direction different from that in FIG. 1.

As illustrated in FIGS. 1 and 2, the board connector 12 is fixed to a circuit board (not illustrated). Further, a cable connector (not illustrated) which is a mating connector is connected to the board connector 12. A direction in which the board connector 12 and the cable connector (not illustrated) are connected is referred to as a connection axis direction. In addition, a direction orthogonal to the connection axis direction and in which a plurality of terminal units 20 and 22 to be described below are arranged is referred to as a width direction. Further, a direction orthogonal to the connection axis direction and the width direction is referred to as a vertical direction. One side in the connection axis direction is indicated by an arrow Z, one side in the width direction is indicated by an arrow W, and an upper side in the vertical direction is indicated by an arrow U.

Figure 3:
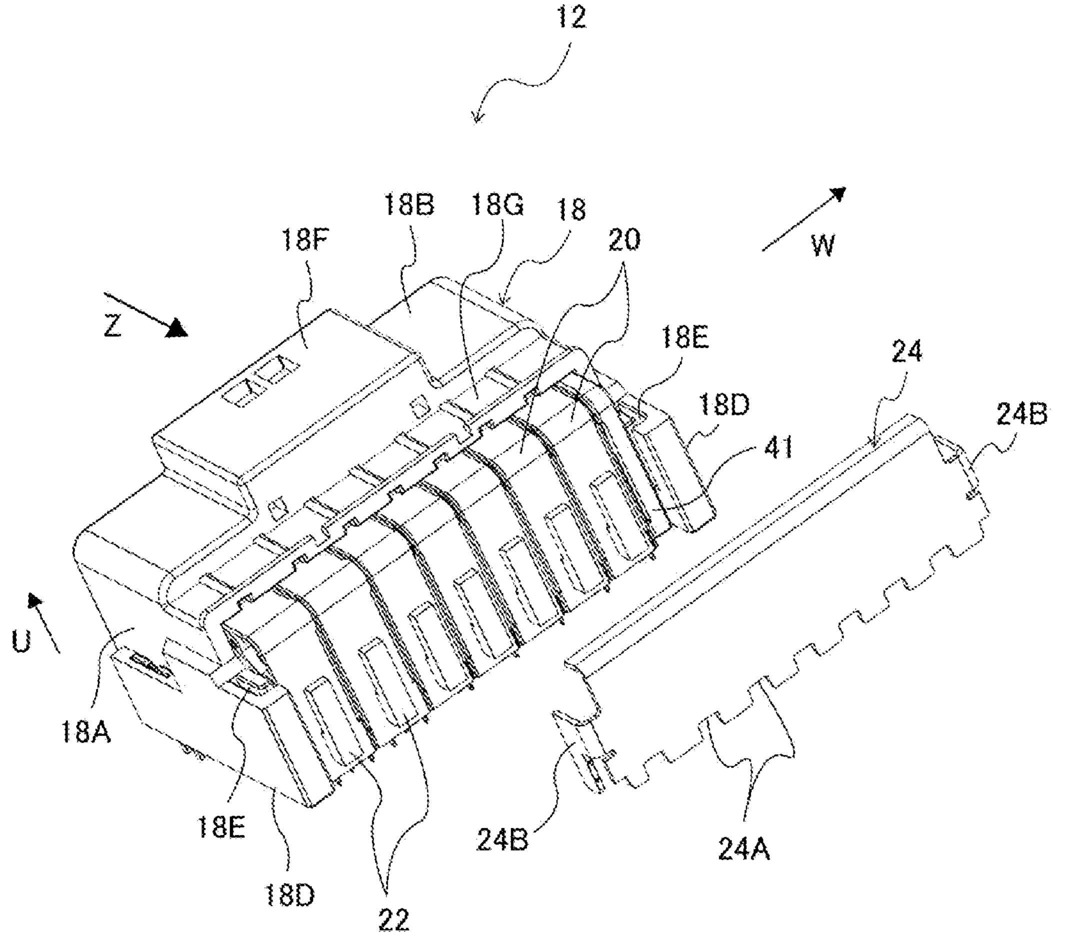
FIG. 3 is a perspective view of a plurality of terminal units arranged in a terminal unit housing and a coupling member.

As illustrated in FIGS. 1, 2, and 3, the board connector 12 includes a terminal unit housing 18, the plurality of terminal units 20 and 22 housed in the terminal unit housing 18, and a coupling member 24 locked to the terminal unit housing 18.

Figure 4:
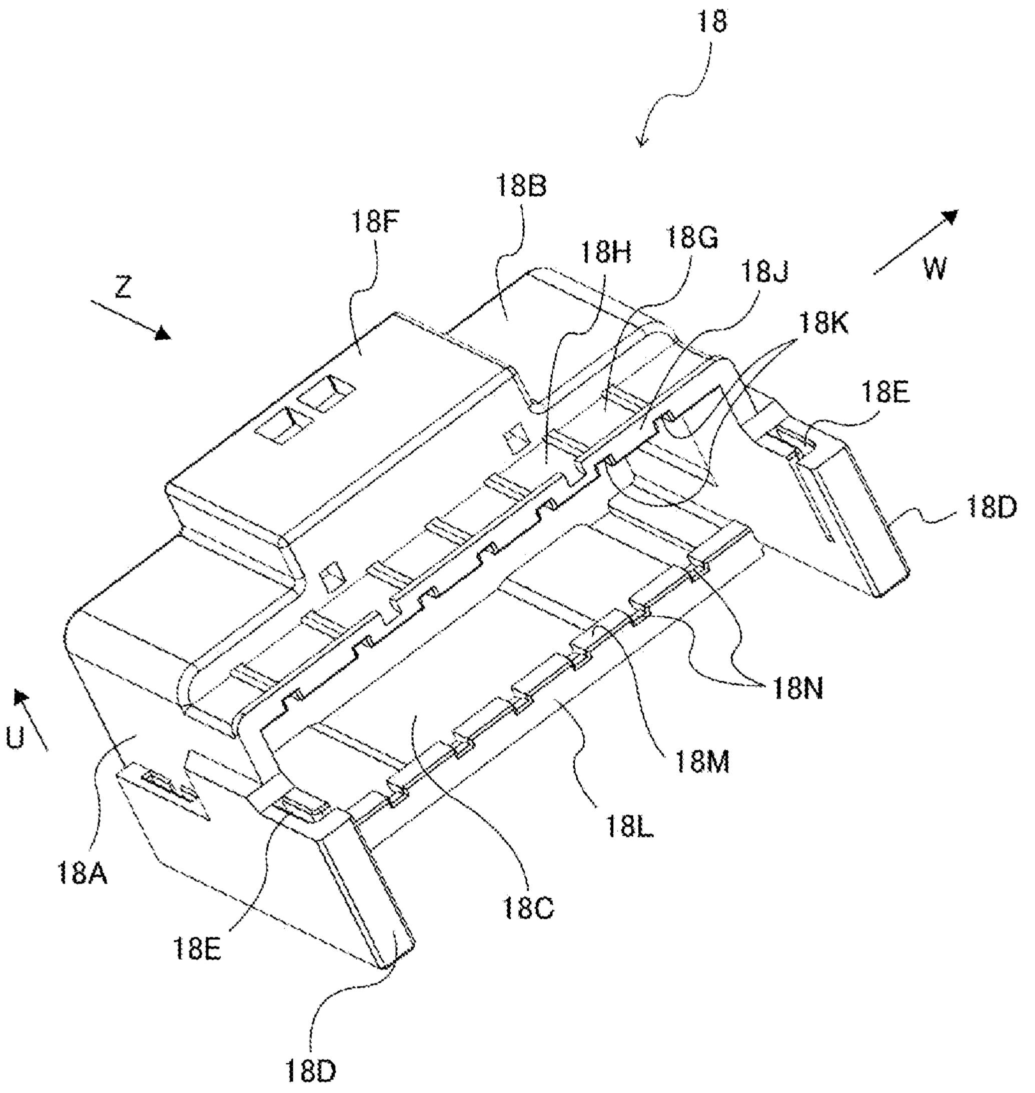
FIG. 4 is a perspective view of the terminal unit housing.
Figure 5:
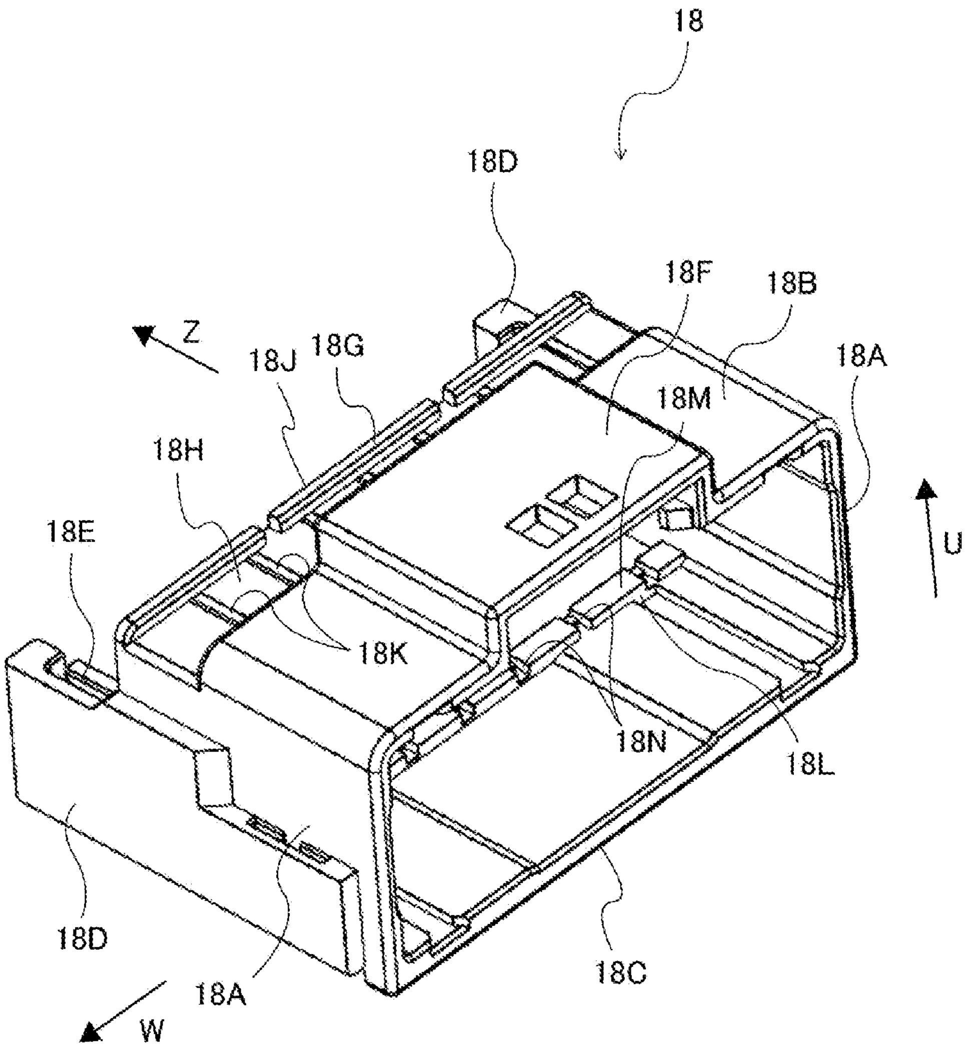
FIG. 5 is a perspective view of the terminal unit housing as viewed from a side opposite to that in FIG. 4.

As illustrated in FIGS. 4 and 5, the terminal unit housing 18 is formed in a rectangular frame shape. The terminal unit housing 18 includes a pair of side wall portions 18A arranged at an interval in the width direction, an upper wall portion 18B connecting upper ends of the pair of side wall portions 18A in the width direction, and a lower wall portion 18C connecting lower ends of the pair of side wall portions 18A in the width direction.

A portion of each of the pair of side wall portions 18A on one side in the connection axis direction is a separation restricting portion 18D extending toward one side in the connection axis direction with respect to the upper wall portion 18B and the lower wall portion 18C. A locking groove 18E in which the coupling member 24 described below is locked is formed in the separation restricting portion 18D of each of the pair of side wall portions 18A.

A first holding portion 18F is formed at a central portion of the upper wall portion 18B in the width direction. An end portion of the upper wall portion 18B on one side in the connection axis direction is an upper locking portion 18G to which upper portions of the plurality of terminal units 20 and 22 described below are locked. The upper locking portion 18G includes an upper substrate portion 18H extending in the width direction with the vertical direction as a thickness direction, and an upper flange portion 18J bent and extending upward from an end of the upper substrate portion 18H on one side in the connection axis direction. In the upper locking portion 18G, a plurality of upper locking grooves 18K arranged at intervals in the width direction are formed in the connection axis direction. The number of upper locking grooves 18K is equal to the number of terminal units 20 and 22 described below. That is, in the present embodiment, seven upper locking grooves 18K are formed in the upper locking portion 18G. In addition, the upper locking groove 18K is formed in such a way as to penetrate the upper substrate portion 18H, and is formed in such a way that a lower side of the upper locking groove 18K is opened at a lower portion of the upper flange portion 18J.

An end portion of the lower wall portion 18C on one side in the connection axis direction is a lower locking portion 18L to which lower portions of the plurality of terminal units 20 and 22 described below are locked. The lower locking portion 18L includes a lower flange portion 18M bent and extending upward from an end of the lower wall portion 18C on one side in the connection axis direction. In the lower flange portion 18M, a plurality of lower locking grooves 18N arranged at intervals in the width direction are formed in the connection axis direction. The number of lower locking grooves 18N is equal to the number of terminal units 20 and 22 described below. That is, in the embodiment, seven lower locking grooves 18N are formed in the lower flange portion 18M. Further, the lower locking groove 18N is formed in such a way that an upper side of the lower locking groove 18N is opened at an upper portion of the lower flange portion 18M.

Figure 6:
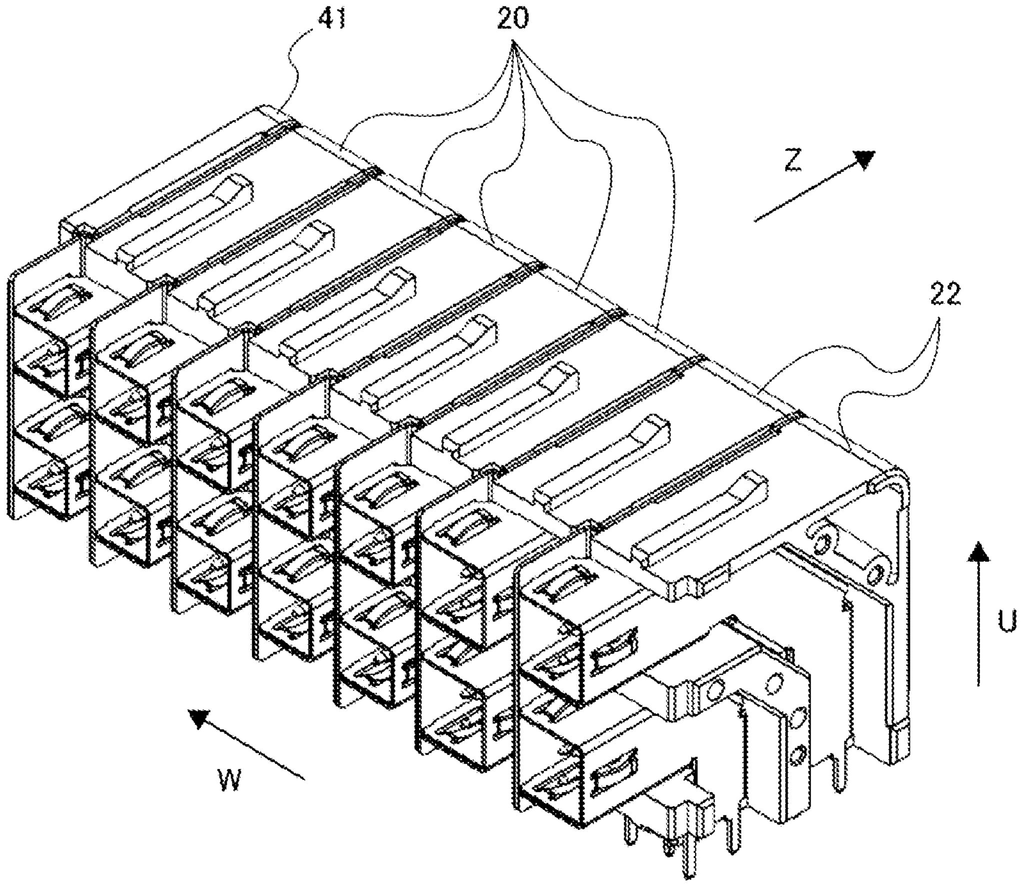
FIG. 6 is a perspective view of the plurality of terminal units engaged with each other.
Figure 7:
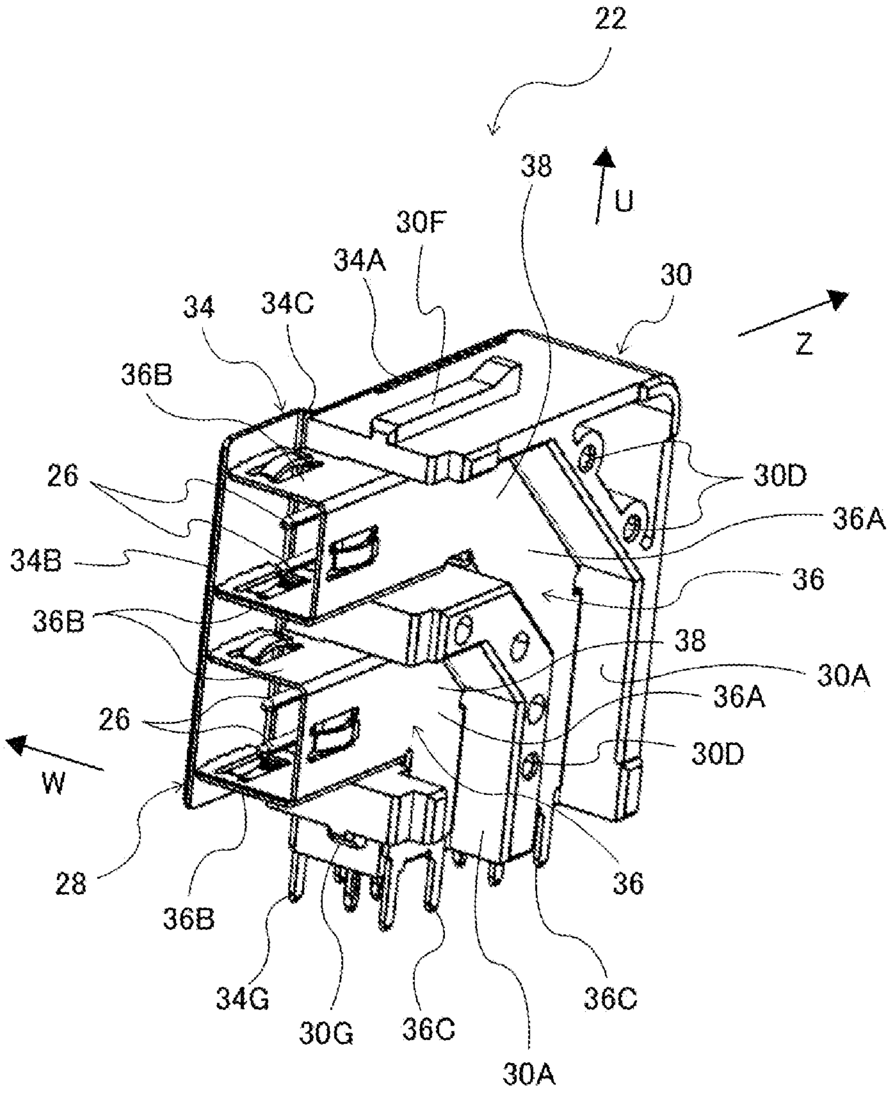
FIG. 7 is a perspective view of the terminal unit.
Figure 8:
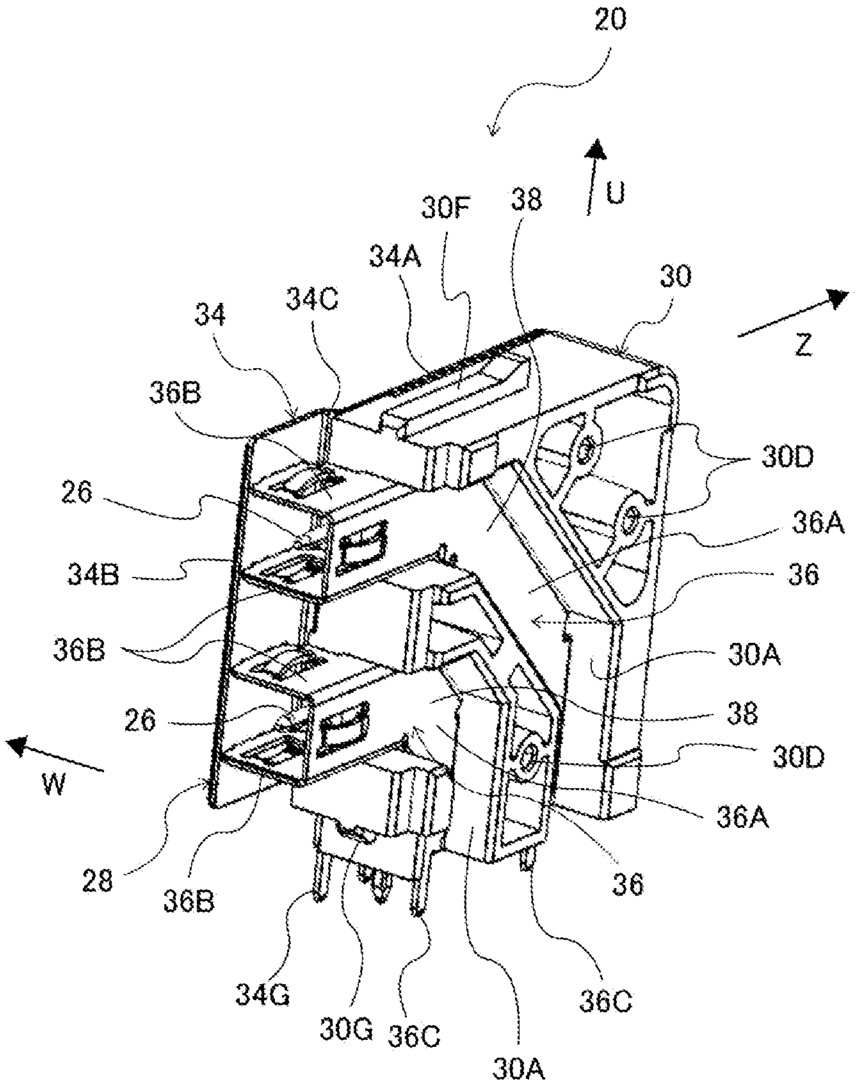
FIG. 8 is a perspective view of the terminal unit.

As illustrated in FIGS. 6, 7, and 8, the board connector 12 of the embodiment includes five terminal units 20 and two terminal units 22. Here, as illustrated in FIGS. 7 and 8, the configurations of the terminal unit 20 and the terminal unit 22 are similar to each other except that the number of inner terminals 26 is different. Therefore, hereinafter, the configuration of the terminal unit 22 will be described, and a description of the configuration of the terminal unit 20 will be omitted. In the terminal unit 20, members and portions corresponding to the terminal unit 22 are denoted by the same reference signs as those of the members and portions corresponding to the terminal unit 22.

Figure 9:
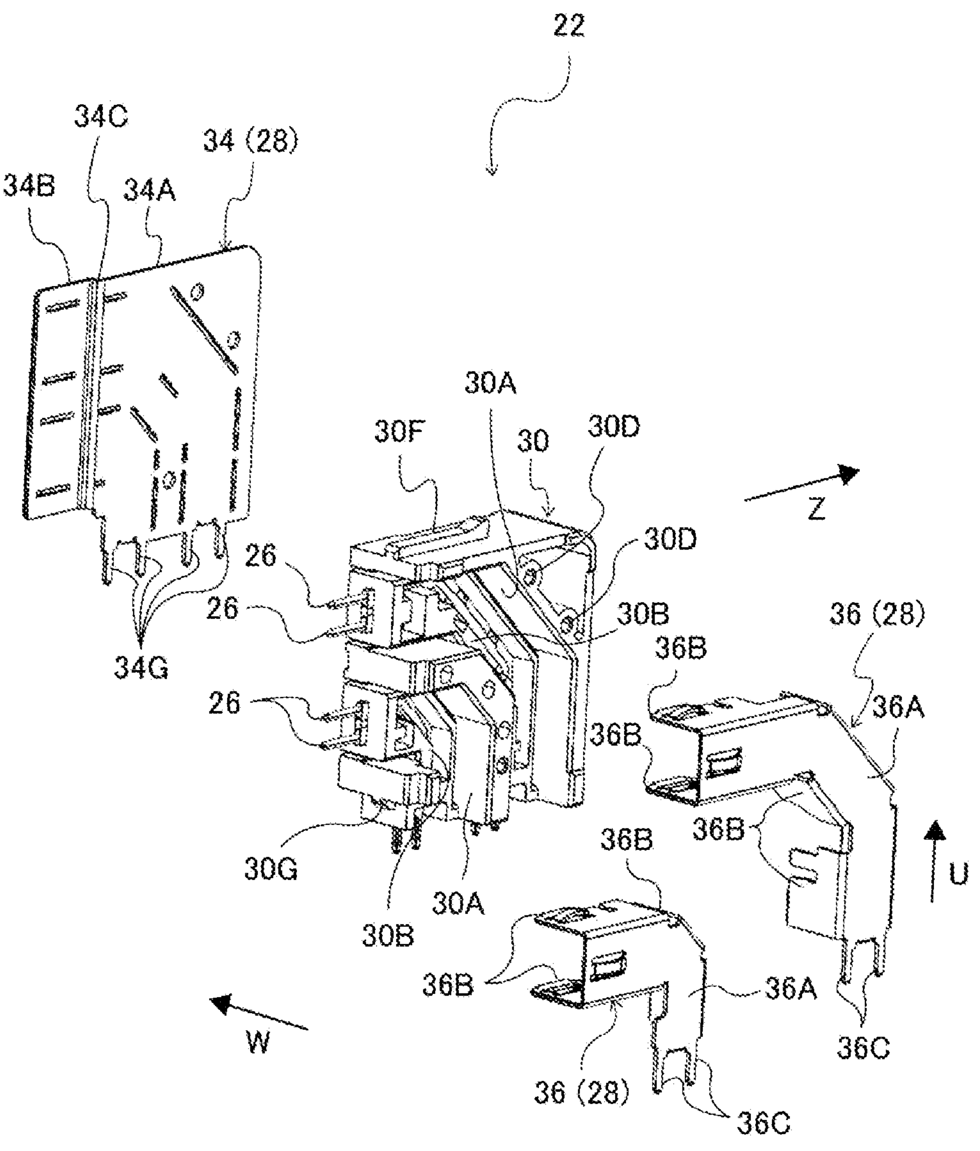
FIG. 9 is an exploded perspective view of the terminal unit.
Figure 10:
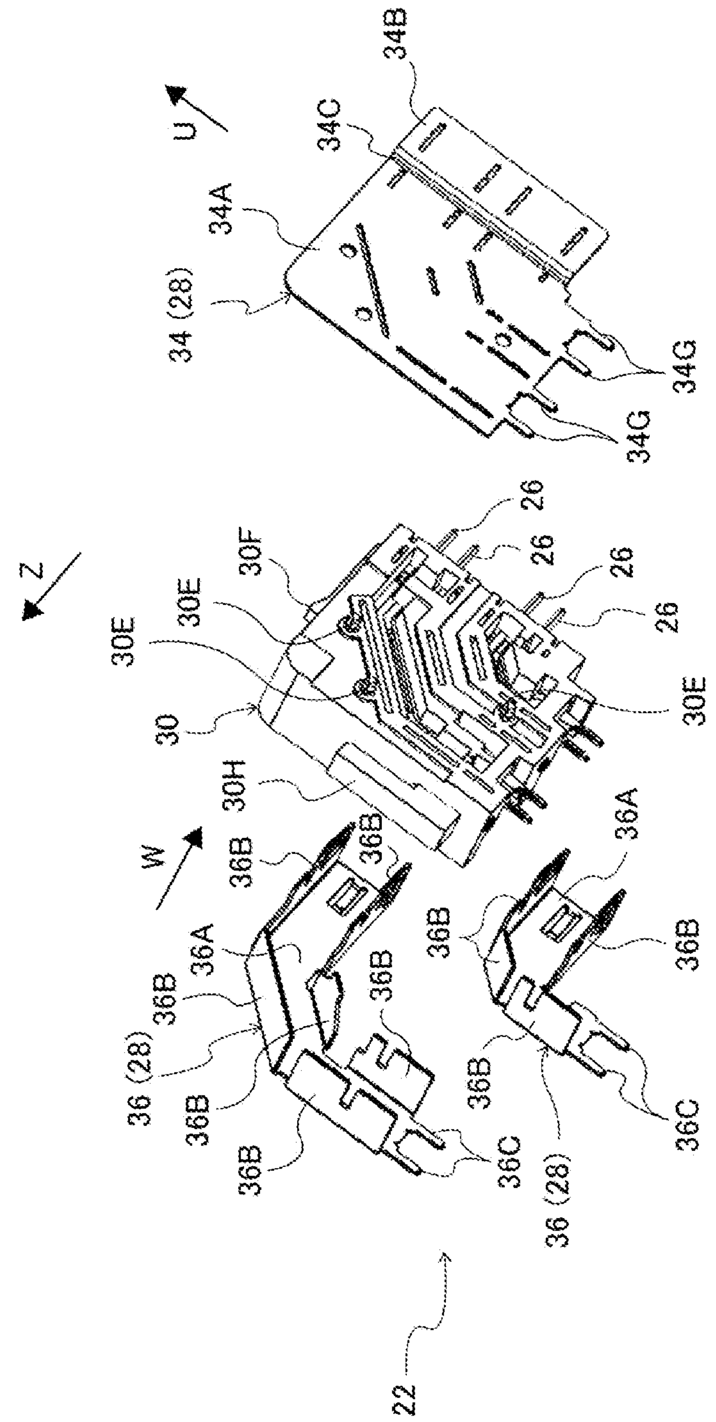
FIG. 10 is an exploded perspective view of the terminal unit as viewed from a direction different from that in FIG. 9.

As illustrated in FIGS. 7, 9, and 10, the terminal unit 22 includes two pairs of inner terminals 26 as terminals and an outer terminal 28 covering the two pairs of inner terminals 26. In addition, the terminal unit 22 includes a terminal body 30 as a dielectric portion.

The two pairs of inner terminals 26 are formed using a conductive metal material. A detailed configuration of the two pairs of inner terminals 26 will be described below.

As illustrated in FIGS. 9 and 10, the outer terminal 28 includes one first terminal forming plate 34 formed of a metal plate, and two second terminal forming plates 36 formed of a metal plate and arranged on the other side in the width direction with respect to the first terminal forming plate 34.

The first terminal forming plate 34 is formed by bending a metal plate cut into a predetermined shape. The first terminal forming plate 34 includes a rectangular first main plate portion 34A extending in the vertical direction and the connection axis direction with the width direction as the thickness direction, and a rectangular terminal-side extending portion 34B extending from an end of the first main plate portion 34A on the other side in the connection axis direction toward the other side in the connection axis direction. A step portion 34C having a height difference in the width direction is formed at a boundary between the first main plate portion 34A and the terminal-side extending portion 34B. Accordingly, the terminal-side extending portion 34B is offset to one side in the width direction with respect to the first main plate portion 34A. In addition, the first terminal forming plate 34 includes a connection piece portion 34G which protrudes from the first main plate portion 34A and is connected to the circuit board (not illustrated).

One of the second terminal forming plates 36 is formed by bending a metal plate cut into a predetermined shape. This second terminal formation plate 36 includes a second main plate portion 36A extending in the vertical direction and the connection axis direction with the width direction as the thickness direction. The second main plate portion 36A has a shape corresponding to a pair of inner terminals 26 of the two pairs of inner terminals 26 as viewed in the width direction. The second terminal forming plate 36 includes a plurality of second side plate portions 36B extending from ends of the second main plate portion 36A toward the first main plate portion 34A of the first terminal forming plate 34. Further, the second terminal forming plate 36 includes a connection piece portion 36C which protrudes from the second main plate portion 36A and is connected to the circuit board (not illustrated).

The other one of the second terminal forming plates 36 is formed by bending a metal plate cut into a predetermined shape smaller than the one second terminal forming plate 36. This second terminal forming plate 36 includes a second main plate portion 36A and a plurality of second side plate portions 36B respectively corresponding to the second main plate portion 36A and the plurality of second side plate portions 36B of the one second terminal forming plate 36. The second main plate portion 36A of the other second terminal forming plate 36 has a shape corresponding to the remaining pair of inner terminals 26 of the two pairs of inner terminals 26 as viewed in the width direction.

Then, as illustrated in FIGS. 7, 9, and 10, a terminal-side cover portion 38 that covers most of a pair of inner terminals 26 of the two pairs of inner terminals 26 is formed by the first terminal forming plate 34 and the one second terminal forming plate 36. Further, the first terminal forming plate 34 and the other second terminal forming plate 36 form the terminal-side cover portion 38 that covers most of the remaining pair of inner terminals 26 of the two pairs of inner terminals 26.

As illustrated in FIGS. 9, 10, 11, and 12, the terminal body 30 is formed in a rectangular box shape using a resin material. In the terminal body 30, two inner terminal support recesses 30A opened on the other side in the width direction are formed. Bottom portions of the two inner terminal support recesses 30A are terminal support portions 30B that respectively support the two pairs of inner terminals 26 described in detail below. The second main plate portion 36A and the second side plate portions 36B of the one second terminal forming plate 36 are arranged in one of the inner terminal support recesses 30A. Further, the second main plate portion 36A and the second side plate portions 36B of the other second terminal forming plate 36 are arranged in the other one of the inner terminal support recesses 30A.

In addition, the terminal body 30 includes three fitted portions 30D having holes opened on the other side in the width direction. In addition, the terminal body 30 includes three fitting portions 30E which are protruding portions protruding toward one side in the width direction. As illustrated in FIGS. 6, 9, 10, 11, and 12, the fitting portion 30E of the terminal body 30 of one terminal unit 20 or 22 and the fitted portion 30D of the terminal body 30 of the other terminal unit 20 or 22 are fitted to each other, the one terminal unit 20 or 22 and the other terminal unit 20 or 22 being adjacent to each other in the width direction, so that relative displacement of the one terminal unit 20 or 22 in the connection axis direction and the vertical direction with respect to the other terminal unit 20 or 22 is restricted. Openings through which the three fitting portions 30E are inserted are formed in the first main plate portion 34A of the first terminal forming plate 34.

An upper locking protrusion 30F protruding upward is formed in the connection axis direction at a central portion of an upper portion of the terminal body 30 in the width direction. A lower locking protrusion 30G protruding downward is formed in the connection axis direction at a central portion of a lower portion of the terminal body 30 in the width direction. Further, a coupling member locking portion 30H to which the coupling member 24 described below is locked is formed in the vertical direction at a central portion of an end portion of the terminal body 30 in the connection axis direction, in the width direction.

As illustrated in FIG. 3, the coupling member 24 is formed using a metal plate. A plurality of locking grooves 24A into which the coupling member locking portions 30H of the terminal body 30 are fitted are formed in a lower portion of the coupling member 24. The plurality of locking grooves 24A are arranged at intervals in the width direction. The number of locking grooves 24A is equal to the number of terminal units 20 and 22. That is, in the embodiment, seven locking grooves 24A are formed in the coupling member 24. Both end portions of the coupling member 24 in the width direction are housing locking portions 24B locked to the locking grooves 18E formed in the separation restricting portions 18D of the terminal unit housing 18.

As illustrated in FIGS. 1 to 12, the board connector 12 of the embodiment is assembled by the following procedure.

First, the plurality of terminal units 20 and 22 are arranged in the width direction in a state where adjacent terminal units are in contact with each other. At this time, the fitting portion 30E of the terminal body 30 of the terminal unit 20 or 22 is fitted to the fitted portion 30D of the terminal body 30 of the other adjacent terminal unit 20 or 22. In the embodiment, a spacer 41 is provided on one side in the width direction. The fitting portion 30E of the terminal body 30 of the terminal unit 20 arranged at an end portion on one side in the width direction is fitted to the spacer 41.

Next, the plurality of terminal units 20 and 22 arranged in the width direction are assembled into the terminal unit housing 18. That is, the plurality of terminal units 20 and 22 arranged in the width direction are inserted into the terminal unit housing 18 by moving the plurality of terminal units 20 and 22 arranged in the width direction toward the other side in a connection direction. At this time, the upper locking protrusion 30F of the terminal body 30 of each of the terminal units 20 and 22 is arranged in the upper locking groove 18K formed in the terminal unit housing 18, and the lower locking protrusion 30G of the terminal body 30 of each of the terminal units 20 and 22 is arranged in the lower locking groove 18N formed in the terminal unit housing 18. Then, the upper locking protrusion 30F of the terminal body 30 of each of the terminal units 20 and 22 gets over the upper locking portion 18G of the terminal unit housing 18 and is locked to the upper locking portion 18G. The lower locking protrusion 30G of the terminal body 30 of each of the terminal units 20 and 22 gets over the lower locking portion 18L of the terminal unit housing 18 and is locked to the lower locking portion 18L. As a result, the terminal units 20 and 22 are assembled into the terminal unit housing 18.

Next, the housing locking portion 24B of the coupling member 24 is locked to the locking groove 18E formed in the separation restricting portion 18D of the terminal unit housing 18, and the coupling member locking portion 30H of the terminal body 30 of each of the terminal units 20 and 22 is locked to each locking groove 24A of the coupling member 24.

Through the above steps, the board connector 12 is assembled.

Next, the detailed configurations of the two pairs of inner terminals 26 and the terminal body 30, which are main configurations of the embodiment, will be described.

Figure 11:
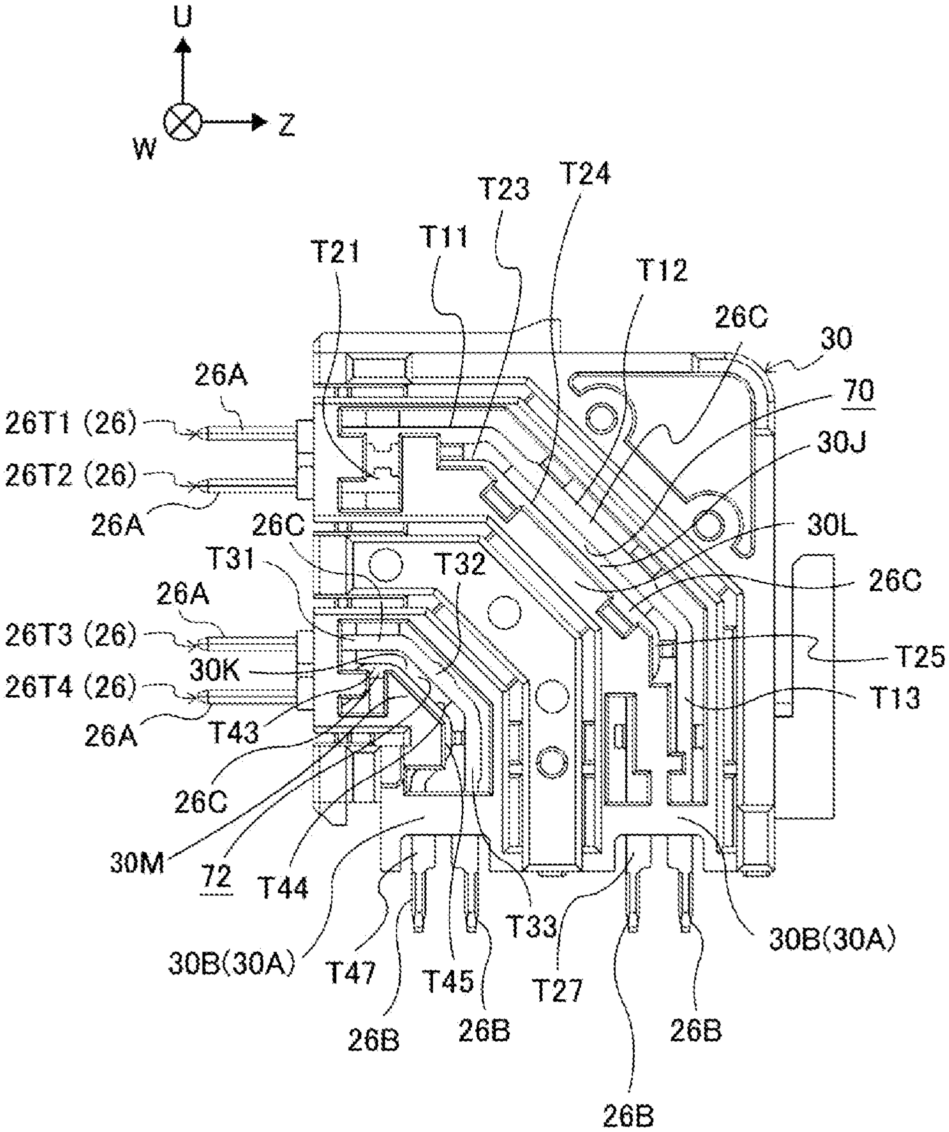
FIG. 11 is a side view of an inner terminal body.
Figure 12:
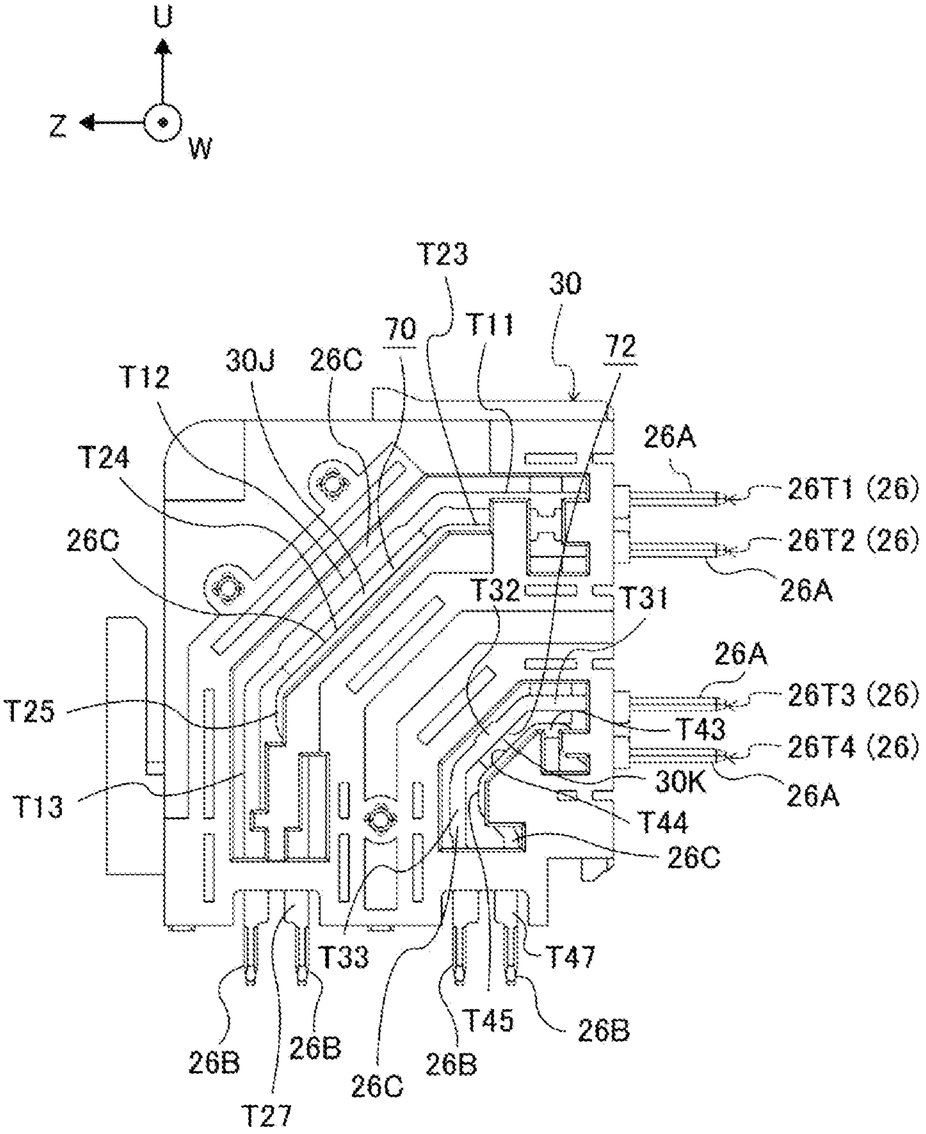
FIG. 12 is a side view of the inner terminal body as viewed from a side opposite to that in FIG. 11.
Figure 13:
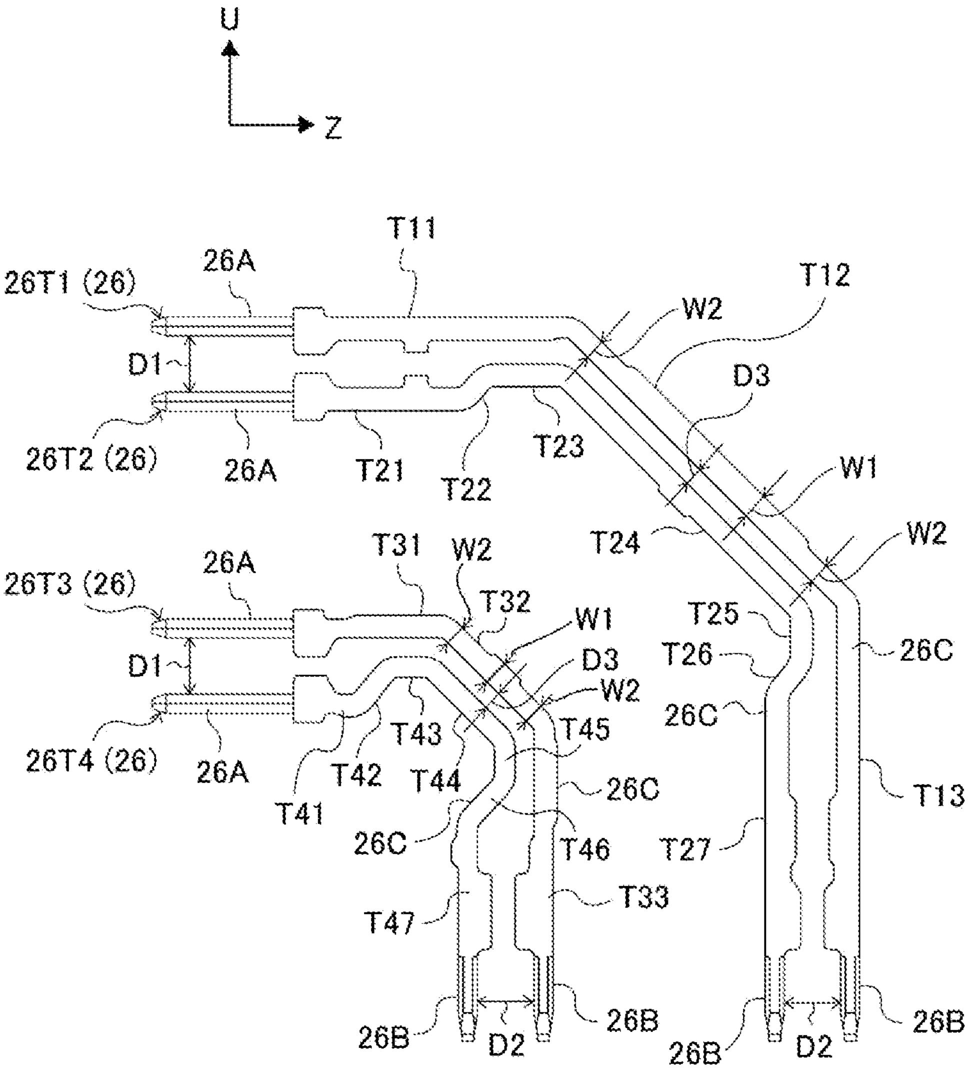
FIG. 13 is a side view of inner terminals.

As illustrated in FIGS. 11 and 13, a pair of inner terminals 26 (a first inner terminal 26T1 and a second inner terminal 26T2 described below) of the two pairs of inner terminals 26 is supported by the terminal support portion 30B of the one inner terminal support recess 30A formed on an upper side of the terminal body 30 and one side in the connection axis direction. The terminal support portion 30B of the other inner terminal support recess 30A formed on a lower side of the terminal body 30 and on the other side in the connection axis direction supports the remaining pair of inner terminals 26 (a third inner terminal 26T3 and a fourth inner terminal 26T4 described below) of the two pairs of inner terminals 26.

These inner terminals 26 are terminals through which a differential signal is transmitted. These inner terminals 26 each include a fitting-side extending portion 26A as a first connecting portion that is one side end portion of the inner terminal 26, a board-side extending portion 26B as a second connecting portion that is the other side end portion of the inner terminal 26, and an intermediate extending portion 26C as a coupling portion coupling the fitting-side extending portion 26A and the board-side extending portion 26B to each other. The fitting-side extending portion 26A extends in the connection axis direction, and is a portion to which a terminal of a wiring connector (not illustrated) is fitted. The board-side extending portion 26B extends in the vertical direction and is a portion connected to the circuit board (not illustrated).

Here, the inner terminal 26 including the fitting-side extending portion 26A arranged on the uppermost side is referred to as a first inner terminal 26T1. The inner terminal 26 arranged adjacent to the first inner terminal 26T1 is referred to as a second inner terminal 26T2. Further, the inner terminal 26 including the fitting-side extending portion 26A arranged below the fitting-side extending portion 26A of the second inner terminal 26T2 is referred to as a third inner terminal 26T3. The inner terminal 26 arranged adjacent to the third inner terminal 26T3 is referred to as a fourth inner terminal 26T4.

The intermediate extending portion 26C of the first inner terminal 26T1 includes a first intermediate portion T11 extending from the fitting-side extending portion 26A toward one side in the connection axis direction, and a second intermediate portion T12 extending obliquely downward from an end of the first intermediate portion T11 on a side opposite to the fitting-side extending portion 26A toward one side in a fitting direction. The intermediate extending portion 26C of the first inner terminal 26T1 includes a third intermediate portion T13 extending downward from an end of the second intermediate portion T12 on a side opposite to the first intermediate portion T11 and having a lower end connected to the board-side extending portion 26B.

The intermediate extending portion 26C of the second inner terminal 26T2 includes a first intermediate portion T21 extending from the fitting-side extending portion 26A toward one side in the connection axis direction, and a second intermediate portion T22 extending obliquely upward from an end of the first intermediate portion T21 on a side opposite to the fitting-side extending portion 26A toward one side in the fitting direction. The intermediate extending portion 26C of the second inner terminal 26T2 includes a third intermediate portion T23 extending from an end of the second intermediate portion T22 on a side opposite to the first intermediate portion T21 toward one side in the connection axis direction, and a fourth intermediate portion T24 extending obliquely downward from an end of the third intermediate portion T23 on a side opposite to the second intermediate portion T22 toward one side in the fitting direction. Further, the intermediate extending portion 26C of the second inner terminal 26T2 includes a fifth intermediate portion T25 extending downward from an end of the fourth intermediate portion T24 on a side opposite to the third intermediate portion T23, and a sixth intermediate portion T26 extending obliquely toward the other side in the connection axis direction from an end of the fifth intermediate portion T25 on a side opposite to the fourth intermediate portion T24 toward the lower side. The intermediate extending portion 26C of the second inner terminal 26T2 includes a seventh intermediate portion T27 extending downward from an end of the sixth intermediate portion T26 on a side opposite to the fifth intermediate portion T25 and having a lower end connected to the board-side extending portion 26B.

In the embodiment, the first intermediate portion T11 of the intermediate extending portion 26C of the first inner terminal 26T1 and the first intermediate portion T21 and the third intermediate portion T23 of the intermediate extending portion 26C of the second inner terminal 26T2 extend in parallel. In addition, the second intermediate portion T12 of the intermediate extending portion 26C of the first inner terminal 26T1 and the fourth intermediate portion T24 of the intermediate extending portion 26C of the second inner terminal 26T2 extend in parallel. Further, the third intermediate portion T13 of the intermediate extending portion 26C of the first inner terminal 26T1 and the fifth intermediate portion T25 and the seventh intermediate portion T27 of the intermediate extending portion 26C of the second inner terminal 26T2 extend in parallel.

Here, an spacing between the fitting-side extending portion 26A of the first inner terminal 26T1 and the fitting-side extending portion 26A of the second inner terminal 26T2 is defined as D1. An spacing between the board-side extending portion 26B of the first inner terminal 26T1 and the board-side extending portion 26B of the second inner terminal 26T2 is defined as D2. Further, an spacing between the second intermediate portion T12 of the intermediate extending portion 26C of the first inner terminal 26T1 and the fourth intermediate portion T24 of the intermediate extending portion 26C of the second inner terminal 26T2 is defined as D3. In the embodiment, a path of the intermediate extending portion 26C of the second inner terminal 26T2 is set in such a way that the interval D3 is smaller than the interval D1 and the interval D2. As a result, an electrical length of the intermediate extending portion 26C of the second inner terminal 26T2 is brought close to an electrical length of the intermediate extending portion 26C of the first inner terminal 26T1.

The intermediate extending portion 26C of the third inner terminal 26T3 includes a first intermediate portion T31 extending from the fitting-side extending portion 26A toward one side in the connection axis direction, and a second intermediate portion T32 extending obliquely downward from an end of the first intermediate portion T31 on a side opposite to the fitting-side extending portion 26A toward one side in a fitting direction. The intermediate extending portion 26C of the third inner terminal 26T3 includes a third intermediate portion T33 extending downward from an end of the second intermediate portion T32 opposite to the first intermediate portion T31 and having a lower end connected to the board-side extending portion 26B.

The intermediate extending portion 26C of the fourth inner terminal 26T4 includes a first intermediate portion T41 extending from the fitting-side extending portion 26A toward one side in the connection axis direction, and a second intermediate portion T42 extending obliquely upward from an end of the first intermediate portion T41 on a side opposite to the fitting-side extending portion 26A toward one side in the fitting direction. The intermediate extending portion 26C of the fourth inner terminal 26T4 includes a third intermediate portion T43 extending from an end of the second intermediate portion T42 opposite to the first intermediate portion T41 toward one side in the connection axis direction, and a fourth intermediate portion T44 extending obliquely downward from an end of the third intermediate portion T43 opposite to the second intermediate portion T42 toward one side in the fitting direction. Further, the intermediate extending portion 26C of the fourth inner terminal 26T4 includes a fifth intermediate portion T45 extending downward from an end of the fourth intermediate portion T44 on a side opposite to the third intermediate portion T43, and a sixth intermediate portion T46 extending obliquely toward the other side in the connection axis direction from an end of the fifth intermediate portion T45 on a side opposite to the fourth intermediate portion T44 toward the lower side. The intermediate extending portion 26C of the fourth inner terminal 26T4 includes a seventh intermediate portion T47 extending downward from an end of the sixth intermediate portion T46 opposite to the fifth intermediate portion T45 and having a lower end connected to the board-side extending portion 26B.

In the embodiment, the first intermediate portion T31 of the intermediate extending portion 26C of the third inner terminal 26T3 and the first intermediate portion T41 and the third intermediate portion T43 of the intermediate extending portion 26C of the fourth inner terminal 26T4 extend in parallel. In addition, the second intermediate portion T32 of the intermediate extending portion 26C of the third inner terminal 26T3 and the fourth intermediate portion T44 of the intermediate extending portion 26C of the fourth inner terminal 26T4 extend in parallel. Further, the third intermediate portion T33 of the intermediate extending portion 26C of the third inner terminal 26T3 and the fifth intermediate portion T45 and the seventh intermediate portion T47 of the intermediate extending portion 26C of the fourth inner terminal 26T4 extend in parallel.

Here, an spacing between the fitting-side extending portion 26A of the third inner terminal 26T3 and the fitting-side extending portion 26A of the fourth inner terminal 26T4 is defined as D1. An spacing between the board-side extending portion 26B of the third inner terminal 26T3 and the board-side extending portion 26B of the fourth inner terminal 26T4 is defined as D2. Further, an spacing between the second intermediate portion T32 of the intermediate extending portion 26C of the third inner terminal 26T3 and the fourth intermediate portion T44 of the intermediate extending portion 26C of the fourth inner terminal 26T4 is defined as D3. In the embodiment, a path of the intermediate extending portion 26C of the fourth inner terminal 26T4 is set in such a way that the interval D3 is smaller than the interval D1 and the interval D2. As a result, an electrical length of the intermediate extending portion 26C of the fourth inner terminal 26T4 is brought close to an electrical length of the intermediate extending portion 26C of the third inner terminal 26T3.

As illustrated in FIG. 11, the intermediate extending portion 26C of each of the first inner terminal 26T1, the second inner terminal 26T2, the third inner terminal 26T3, and the fourth inner terminal 26T4 described above is partially embedded in the terminal support portion 30B of the inner terminal support recess 30A. As a result, the first inner terminal 26T1, the second inner terminal 26T2, the third inner terminal 26T3, and the fourth inner terminal 26T4 are held by the terminal body 30.

Here, in the embodiment, a low-dielectric constant portion 70 is interposed between the second intermediate portion T12 of the intermediate extending portion 26C of the first inner terminal 26T1 and the fourth intermediate portion T24 of the intermediate extending portion 26C of the second inner terminal 26T2. The low-dielectric constant portion 70 is a portion set to have a lower relative dielectric constant than a resin material forming the terminal body 30. The low-dielectric constant portion 70 of the embodiment is a gap formed between the second intermediate portion T12 of the intermediate extending portion 26C of the first inner terminal 26T1 and the fourth intermediate portion T24 of the intermediate extending portion 26C of the second inner terminal 26T2. Only air exists in the gap which is the low-dielectric constant portion 70, and a solid such as a part of the terminal body 30 does not exist. In a state where the terminal body 30 is viewed in the width direction, a rectangular opening 30J is formed at a position corresponding to the low-dielectric constant portion 70 in the terminal support portion 30B. The opening 30J penetrates the terminal support portion 30B in the width direction.

A low-dielectric constant portion 72 is interposed between the second intermediate portion T32 of the intermediate extending portion 26C of the third inner terminal 26T3 and the fourth intermediate portion T44 of the intermediate extending portion 26C of the fourth inner terminal 26T4. The low-dielectric constant portion 72 is the same gap as the low-dielectric constant portion 70 interposed between the second intermediate portion T12 of the intermediate extending portion 26C of the first inner terminal 26T1 and the fourth intermediate portion T24 of the intermediate extending portion 26C of the second inner terminal 26T2. Only air exists in the gap which is the low-dielectric constant portion 72, and a solid such as a part of the terminal body 30 does not exist. In a state where the terminal body 30 is viewed in the width direction, a rectangular opening 30K is formed at a position corresponding to the low-dielectric constant portion 72 in the terminal support portion 30B. The opening 30K penetrates the terminal support portion 30B in the width direction.

Further, in the embodiment, a side of the fourth intermediate portion T24 of the intermediate extending portion 26C of the second inner terminal 26T2 that is opposite to the low-dielectric constant portion 70 is covered with a part of the terminal support portion 30B (hereinafter referred to as "cover portion 30L") in the width direction. The cover portion 30L is formed in a rectangular shape that covers, in the width direction, the side of the fourth intermediate portion T24 that is opposite to the low-dielectric constant portion 70 and a central portion of the fourth intermediate portion T24 in a longitudinal direction. A side of the fourth intermediate portion T44 of the intermediate extending portion 26C of the fourth inner terminal 26T4 that is opposite to the low-dielectric constant portion 72 is covered with a part of the terminal support portion 30B (hereinafter referred to as "cover portion 30M") in the width direction. The cover portion 30M is formed in a rectangular shape that covers, in the width direction, the side of the fourth intermediate portion T44 that is opposite to the low-dielectric constant portion 72 and a central portion of the fourth intermediate portion T44 in the longitudinal direction.

In the embodiment, a side of the second intermediate portion T12 of the intermediate extending portion 26C of the first inner terminal 26T1 that is opposite to the low-dielectric constant portion 70 and a central portion of the second intermediate portion T12 in the longitudinal direction bulge only toward a side opposite to the low-dielectric constant portion 70. As a result, a width W1 of the central portion of the second intermediate portion T12 in the longitudinal direction is larger than a width W2 of each of both end portions of the second intermediate portion T12 in the longitudinal direction. In addition, in the embodiment, a side of the second intermediate portion T32 of the intermediate extending portion 26C of the third inner terminal 26T3 that is opposite to the low-dielectric constant portion 72 and a central portion of the second intermediate portion T32 in the longitudinal direction bulge only toward a side opposite to the low-dielectric constant portion 72. As a result, a width W1 of the central portion of the second intermediate portion T32 in the longitudinal direction is larger than a width W2 of each of both end portions of the second intermediate portion T32 in the longitudinal direction.

Actions and Effects of Embodiment

Next, actions and effects of the embodiment will be described.

As illustrated in FIGS. 1 to 3 and FIGS. 6 to 13, the board connector 12 of the embodiment includes the plurality of terminal units 20 and 22 each including the inner terminals 26, the outer terminal 28, and the terminal body 30. The plurality of terminal units 20 and 22 are arranged side by side in the width direction in a state where adjacent terminal units are in contact with each other. As described above, with the configuration of the board connector 12 of the embodiment, it is possible to facilitate variable deployment of the board connector 12 corresponding to variations of electric wire connectors (not illustrated) by setting the number of terminal units 20 and 22 if appropriate.

In addition, the board connector 12 of the embodiment includes the terminal unit 22 having the above-described configuration. In the terminal unit 22, a differential signal is transmitted between the wiring connector and the circuit board via the two pairs of inner terminals 26 (the first inner terminal 26T1 and the second inner terminal 26T2, and the third inner terminal 26T3 and the fourth inner terminal 26T4).

Here, the two pairs of inner terminals 26 (the first inner terminal 26T1 and the second inner terminal 26T2, and the third inner terminal 26T3 and the fourth inner terminal 26T4) are held by the terminal body 30 formed using a resin material. The low-dielectric constant portion 70 having a lower relative dielectric constant than that of the resin material forming the terminal body 30 is interposed between the second intermediate portion T12 of the intermediate extending portion 26C of the first inner terminal 26T1 and the fourth intermediate portion T24 of the intermediate extending portion 26C of the second inner terminal 26T2. Further, the low-dielectric constant portion 72 having a lower relative dielectric constant than that of the resin material forming the terminal body 30 is interposed between the second intermediate portion T32 of the intermediate extending portion 26C of the third inner terminal 26T3 and the fourth intermediate portion T44 of the intermediate extending portion 26C of the fourth inner terminal 26T4. As a result, a decrease in impedance can be suppressed as compared with a configuration in which the resin material forming the terminal body 30 is interposed between portions corresponding to the low-dielectric constant portions 70 and 72.

In addition, the interval D3 between the second intermediate portion T12 of the intermediate extending portion 26C of the first inner terminal 26T1 and the fourth intermediate portion T24 of the intermediate extending portion 26C of the second inner terminal 26T2 is set to be smaller than the interval D1 between the fitting-side extending portion 26A of the first inner terminal 26T1 and the fitting-side extending portion 26A of the second inner terminal 26T2 and the interval D2 between the board-side extending portion 26B of the first inner terminal 26T1 and the board-side extending portion 26B of the second inner terminal 26T2. In addition, the interval D3 between the second intermediate portion T32 of the intermediate extending portion 26C of the third inner terminal 26T3 and the fourth intermediate portion T44 of the intermediate extending portion 26C of the fourth inner terminal 26T4 is set to be smaller than the interval D1 between the fitting-side extending portion 26A of the third inner terminal 26T3 and the fitting-side extending portion 26A of the fourth inner terminal 26T4 and the interval D2 between the board-side extending portion 26B of the third inner terminal 26T3 and the board-side extending portion 26B of the fourth inner terminal 26T4. As a result, it is possible to reduce the skew of a differential signal as compared with a configuration in which the intervals D1, D2, and D3 are set outside the above range. In addition, as compared with a configuration in which the intervals D1, D2, and D3 are set outside the above range, a common mode impedance at the intermediate extending portion 26C of the first inner terminal 26T1 and the intermediate extending portion 26C of the second inner terminal 26T2 can be increased, and a common mode impedance at the intermediate extending portion 26C of the third inner terminal 26T3 and the intermediate extending portion 26C of the fourth inner terminal 26T4 can be increased. As a result, common mode noise that has occurred is less likely to propagate beyond between the intermediate extending portion 26C of the first inner terminal 26T1 and the intermediate extending portion 26C of the second inner terminal 26T2 and between the intermediate extending portion 26C of the third inner terminal 26T3 and the intermediate extending portion 26C of the fourth inner terminal 26T4, and as a result, propagation of the common mode noise can be suppressed. As described above, with the board connector 12 of the embodiment, it is possible to achieve both a countermeasure against the common mode noise and impedance matching.

In the terminal unit 22 of the embodiment, the intermediate extending portion 26C of each of the first inner terminal 26T1, the second inner terminal 26T2, the third inner terminal 26T3, and the fourth inner terminal 26T4 described above is partially embedded in the terminal support portion 30B of the inner terminal support recess 30A. As a result, the first inner terminal 26T1, the second inner terminal 26T2, the third inner terminal 26T3, and the fourth inner terminal 26T4 are held by the terminal body 30. In addition, in the terminal unit 22 of the embodiment, the above-described low-dielectric constant portions 70 and 72 are gaps. In this configuration, for example, the first inner terminal 26T1, the second inner terminal 26T2, the third inner terminal 26T3, and the fourth inner terminal 26T4 can be held by the terminal body 30 by insert molding. In addition, a portion where a part of the metal mold is positioned can be the gap (the low-dielectric constant portion 70 or 72) by opening the metal mold for insert molding. Thus, the productivity of the connector can be improved. Hereinafter, a process of the insert molding will be briefly described.

Figure 14:
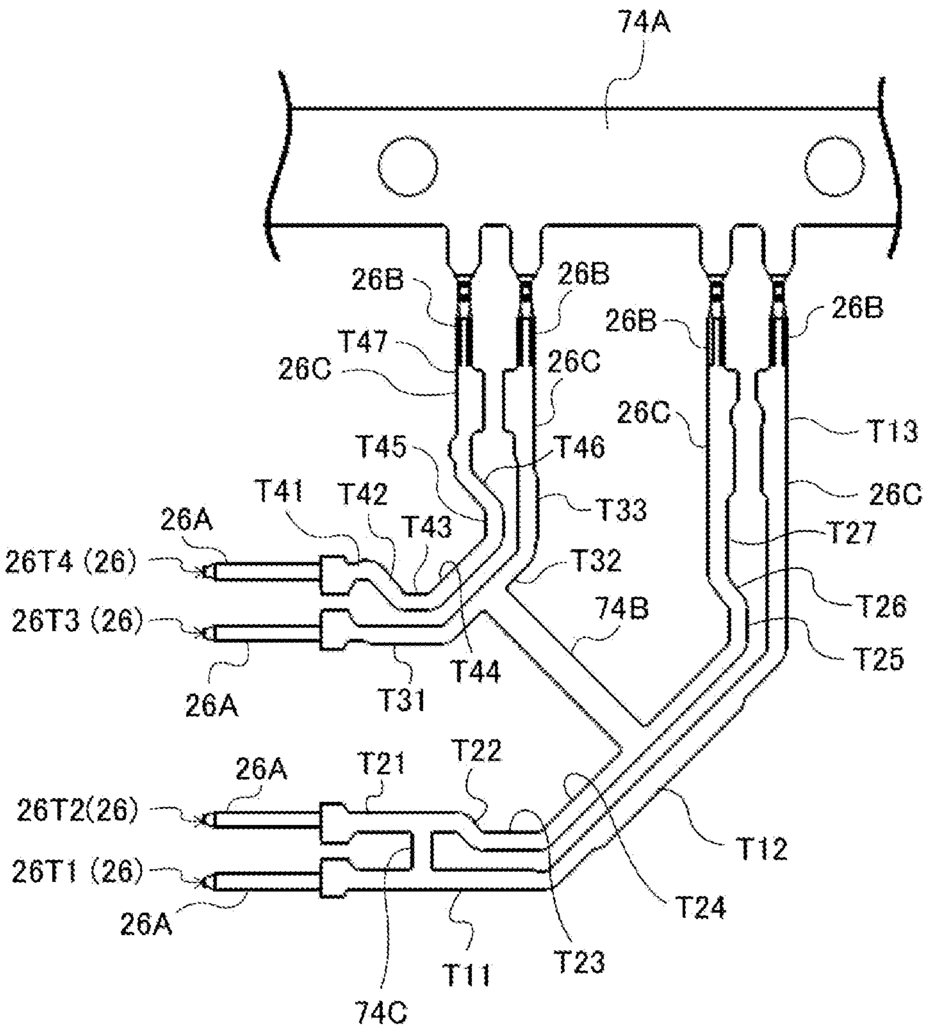
FIG. 14 is a side view illustrating a first step in manufacturing the inner terminal body.

FIG. 14 illustrates the first inner terminal 26T1, the second inner terminal 26T2, the third inner terminal 26T3, and the fourth inner terminal 26T4 in the middle of manufacturing. In the stage illustrated in FIG. 14, the board-side extending portion 26B of each of the first inner terminal 26T1, the second inner terminal 26T2, the third inner terminal 26T3, and the fourth inner terminal 26T4 is connected via a first connecting portion 74A. The fourth intermediate portion T24 of the intermediate extending portion 26C of the second inner terminal 26T2 and the second intermediate portion T32 of the intermediate extending portion 26C of the third inner terminal 26T3 are connected via a second connecting portion 74B. Further, the first intermediate portion T11 of the intermediate extending portion 26C of the first inner terminal 26T1 and the first intermediate portion T21 of the intermediate extending portion 26C of the second inner terminal 26T2 are connected via a third connecting portion 74C.

Figure 15:
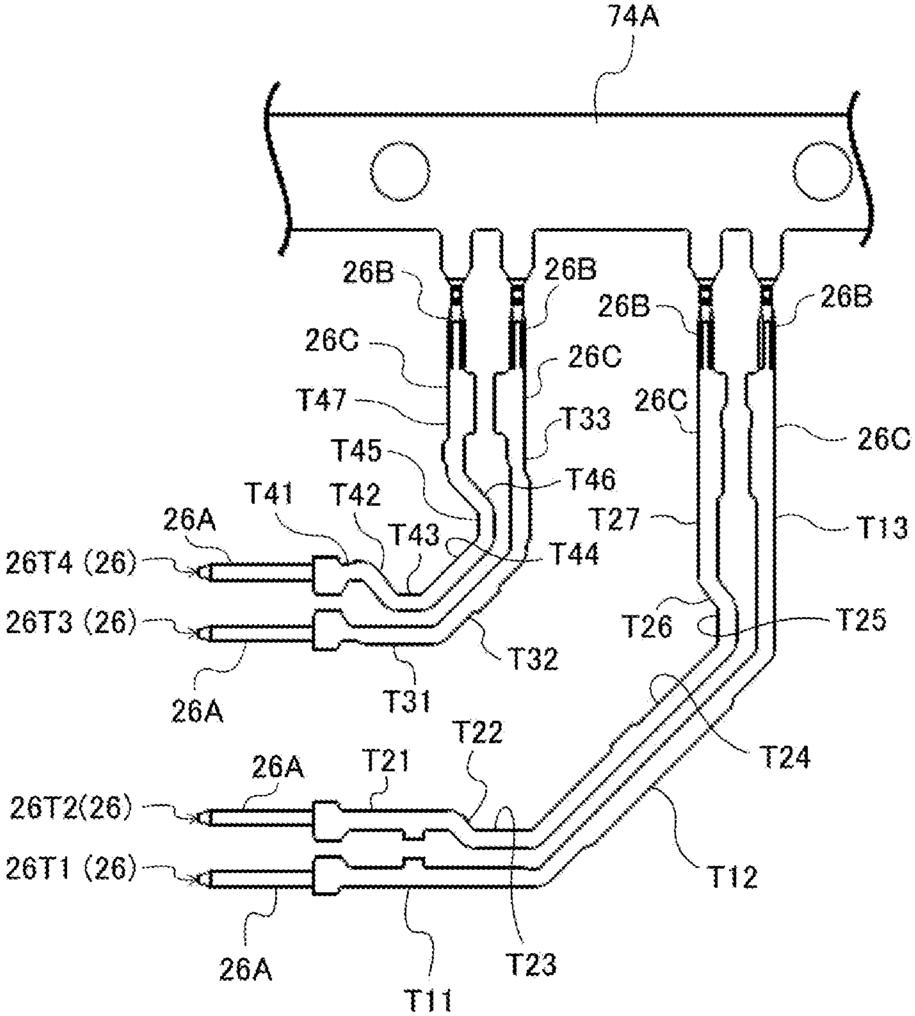
FIG. 15 is a side view illustrating a second step in manufacturing the inner terminal body.

FIG. 15 illustrates the first inner terminal 26T1, the second inner terminal 26T2, the third inner terminal 26T3, and the fourth inner terminal 26T4 in a process subsequent to the process illustrated in FIG. 14. As illustrated in FIG. 15, in this process, most of the second connecting portion 74B and the third connecting portion 74C are removed. Then, in the state illustrated in FIG. 15, the first inner terminal 26T1, the second inner terminal 26T2, the third inner terminal 26T3, and the fourth inner terminal 26T4 are set in a mold. Next, the inside of the mold is filled with a resin material.

Figure 16:
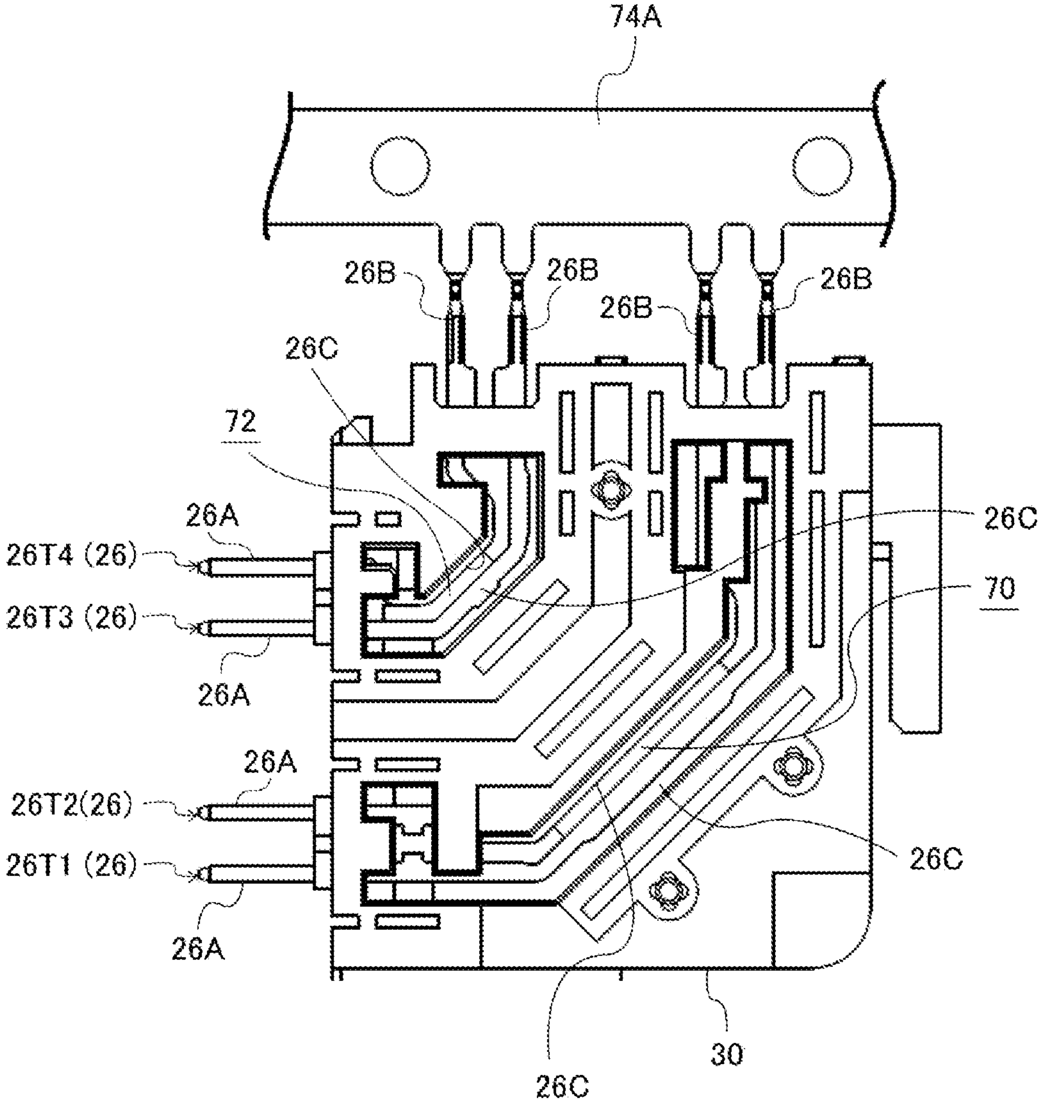
FIG. 16 is a side view illustrating a third step in manufacturing the inner terminal body.

Next, as illustrated in FIG. 16, the terminal body 30 in a state where the first inner terminal 26T1, the second inner terminal 26T2, the third inner terminal 26T3, and the fourth inner terminal 26T4 are held is formed by opening the mold. After this process, the first connecting portion 74A is removed.

As illustrated in FIG. 11, in the terminal unit 22 of the embodiment, the cover portion 30L is a part of the terminal support portion 30B and covers, in the width direction, the side of the fourth intermediate portion T24 that is opposite to the low-dielectric constant portion 70 and the central portion of the fourth intermediate portion T24 in the longitudinal direction. In this configuration, it is possible to suppress an increase in skew of a differential signal due to shortening of the electrical length of the fourth intermediate portion T24 as compared with a configuration in which the entire fourth intermediate portion T24 is covered with the resin material forming the terminal body 30. In addition, in the terminal unit 22 of the embodiment, the cover portion 30M is a part of the terminal support portion 30B and covers, in the width direction, the side of the fourth intermediate portion T44 that is opposite to the low-dielectric constant portion 72 and the central portion of the fourth intermediate portion T44 in the longitudinal direction. In this configuration, it is possible to suppress an increase in skew of a differential signal due to shortening of the electrical length of the fourth intermediate portion T44 as compared with a configuration in which the entire fourth intermediate portion T44 is covered with the resin material forming the terminal body 30.

As illustrated in FIG. 13, the width W1 of the central portion of the second intermediate portion T12 of the intermediate extending portion 26C of the first inner terminal 26T1 in the longitudinal direction is larger than the width W2 of each of both end portions of the second intermediate portion T12 in the longitudinal direction. As a result, the electrical length of the second intermediate portion T12 can be shortened as compared with a configuration in which the second intermediate portion T12 has a uniform width W2. In addition, the second intermediate portion T12 of the intermediate extending portion 26C of the first inner terminal 26T1 and the fourth intermediate portion T24 of the intermediate extending portion 26C of the second inner terminal 26T2 can be arranged close to each other by adopting a configuration in which the side of the second intermediate portion T12 that is opposite to the low-dielectric constant portion 70 and the central portion of the second intermediate portion T12 in the longitudinal direction bulge only toward the side opposite to the low-dielectric constant portion 70. In addition, the width W1 of the central portion of the second intermediate portion T32 of the intermediate extending portion 26C of the third inner terminal 26T3 in the longitudinal direction is larger than the width W2 of each of both end portions of the second intermediate portion T32 in the longitudinal direction. As a result, the electrical length of the second intermediate portion T32 can be shortened as compared with a configuration in which the second intermediate portion T32 has a uniform width W2. In addition, the second intermediate portion T32 of the intermediate extending portion 26C of the third inner terminal 26T3 and the fourth intermediate portion T44 of the intermediate extending portion 26C of the fourth inner terminal 26T4 can be arranged close to each other by adopting a configuration in which the side of the second intermediate portion T32 that is opposite to the low-dielectric constant portion 72 and the central portion of the second intermediate portion T32 in the longitudinal direction bulge only toward the side opposite to the low-dielectric constant portion 72.

In the embodiment, an example has been described in which the width W1 of the central portion of the second intermediate portion T12 of the intermediate extending portion 26C of the first inner terminal 26T1 in the longitudinal direction is larger than the width W2 of each of both end portions of the second intermediate portion T12 in the longitudinal direction, but the present disclosure is not limited thereto. It is sufficient if the width of the second intermediate portion T12 of the intermediate extending portion 26C of the first inner terminal 26T1 is set in consideration of a balance between the electrical length of the first inner terminal 26T1 and the electrical length of the second inner terminal 26T2 if appropriate. In the embodiment, an example has been described in which the width W1 of the central portion of the second intermediate portion T32 of the intermediate extending portion 26C of the third inner terminal 26T3 in the longitudinal direction is larger than the width W2 of each of both end portions of the second intermediate portion T32 in the longitudinal direction, but the present disclosure is not limited thereto. It is sufficient if the width of the second intermediate portion T32 of the intermediate extending portion 26C of the third inner terminal 26T3 is set in consideration of a balance between the electrical length of the third inner terminal 26T3 and the electrical length of the fourth inner terminal 26T4 if appropriate.

In the embodiment, an example has been described in which the cover portions 30L and 30M are parts of the terminal support portion 30B, but the present disclosure is not limited thereto. It is sufficient if whether or not to set parts of the terminal support portion 30B as the cover portions 30L and 30M is determined in consideration of the level of skew of a differential signal if appropriate.

In addition, in the embodiment, an example in which the low-dielectric constant portions 70 and 72 are gaps has been described, but the present disclosure is not limited thereto. For example, a low-dielectric constant portion set to have a lower relative dielectric constant than the resin material forming the terminal body 30 may be interposed at a position corresponding to the low-dielectric constant portions 70 and 72.

In the embodiment, an example has been described in which the interval D3 between the second intermediate portion T12 of the intermediate extending portion 26C of the first inner terminal 26T1 and the fourth intermediate portion T24 of the intermediate extending portion 26C of the second inner terminal 26T2 is set to be smaller than the interval D1 between the fitting-side extending portion 26A of the first inner terminal 26T1 and the fitting-side extending portion 26A of the second inner terminal 26T2 and the interval D2 between the board-side extending portion 26B of the first inner terminal 26T1 and the board-side extending portion 26B of the second inner terminal 26T2, but the present disclosure is not limited thereto. For example, the interval D3 between the second intermediate portion T12 of the intermediate extending portion 26C of the first inner terminal 26T1 and the fourth intermediate portion T24 of the intermediate extending portion 26C of the second inner terminal 26T2 may be set to be smaller than any one of the interval D1 between the fitting-side extending portion 26A of the first inner terminal 26T1 and the fitting-side extending portion 26A of the second inner terminal 26T2 and the interval D2 between the board-side extending portion 26B of the first inner terminal 26T1 and the board-side extending portion 26B of the second inner terminal 26T2.

Further, in the embodiment, an example has been described in which the interval D3 between the second intermediate portion T32 of the intermediate extending portion 26C of the third inner terminal 26T3 and the fourth intermediate portion T44 of the intermediate extending portion 26C of the fourth inner terminal 26T4 is set to be smaller than the interval D1 between the fitting-side extending portion 26A of the third inner terminal 26T3 and the fitting-side extending portion 26A of the fourth inner terminal 26T4 and the interval D2 between the board-side extending portion 26B of the third inner terminal 26T3 and the board-side extending portion 26B of the fourth inner terminal 26T4, but the present disclosure is not limited thereto. For example, the interval D3 between the second intermediate portion T32 of the intermediate extending portion 26C of the third inner terminal 26T3 and the fourth intermediate portion T44 of the intermediate extending portion 26C of the fourth inner terminal 26T4 may be set to be smaller than any one of the interval D1 between the fitting-side extending portion 26A of the third inner terminal 26T3 and the fitting-side extending portion 26A of the fourth inner terminal 26T4 and the interval D2 between the board-side extending portion 26B of the third inner terminal 26T3 and the board-side extending portion 26B of the fourth inner terminal 26T4.

Although an embodiment of the present disclosure has been described above, the present disclosure is not limited thereto, and it is a matter of course that the present disclosure may be variously modified and implemented without departing from the gist of the present disclosure.

What is claimed is:

1. A connector comprising:

a pair of terminals comprising a first terminal and a second terminal, each of which includes a first connecting portion to which a first connection target object is connected, a second connecting portion to which a second connection target object is connected, and a coupling portion that couples the first connecting portion and the second connecting portion to each other, the pair of terminals being arranged with a spacing therebetween and a differential signal being transmitted via the pair of terminals;

a dielectric portion that holds the pair of terminals; and a low-dielectric constant portion that has a lower relative dielectric constant than a relative dielectric constant of the dielectric portion and that is interposed between the coupling portion the first terminal and the coupling portion of the second terminal, wherein a spacing between the coupling portion of the first terminal and the coupling portion of the second terminal is smaller than at least one of a spacing between the first connecting portion of the first terminal and the first connecting portion of the second terminal or a spacing between the second connecting portion of the first terminal and the second connecting portion of the second terminal, and wherein an intermediate portion of the coupling portion of the first terminal bulges only toward an opposite side from a side of the low-dielectric constant portion, and a width of the intermediate portion of the coupling portion of the first terminal is larger than a width of either of respective end portions of the coupling portion of the first terminal.

2. The connector according to claim 1, wherein:

the pair of terminals is held in a state of being embedded in the dielectric portion, and the low-dielectric constant portion is a gap formed between the coupling portion of the first terminal and the coupling portion of the second terminal.

3. The connector according to claim 1, wherein the dielectric portion includes a cover portion which covers part of the coupling portion of the second terminal at a side opposite from the low-dielectric constant portion.

4. A connector, comprising:

a pair of terminals comprising a first terminal and a second terminal, each of which includes a first connecting portion to which a first connection target object is connected, a second connecting portion to which a second connection target object is connected, and a coupling portion that couples together the first connecting portion and the second connecting portion, the pair of terminals being arranged with a spacing therebetween and a differential signal being transmitted via the pair of terminals;

a dielectric portion that holds the pair of terminals; and a low-dielectric constant portion that has a lower relative dielectric constant than a relative dielectric constant of the dielectric portion and that is interposed between the coupling portion of the first terminal and the coupling portion of the second terminal, wherein a spacing between the coupling portion of the first terminal and the coupling portion of the second terminal is smaller than at least one of a spacing between the first connecting portion of the first terminal and the first connecting portion of the second terminal or a spacing between the second connecting portion of the first terminal and the second connecting portion of the second terminal, and wherein an intermediate portion of the coupling portion of the second terminal comprises a first portion that is substantially parallel to the coupling portion of the first terminal, a second portion that extends from the first portion toward the coupling portion of the first terminal such that an entire width of the second portion approaches the coupling portion of the first terminal, and a third portion that extends from the first portion such that an entire width of the third portion withdraws from the coupling portion of the first terminal.

* * * * *